US008524439B2

(12) United States Patent
Hu et al.

(10) Patent No.: US 8,524,439 B2
(45) Date of Patent: Sep. 3, 2013

(54) SILSESQUIOXANE RESIN SYSTEMS WITH BASE ADDITIVES BEARING ELECTRON-ATTRACTING FUNCTIONALITIES

(75) Inventors: Sanlin Hu, Shanghai (CN); Eric Scott Moyer, Midland, MI (US)

(73) Assignees: Dow Corning Corporation, Midland, MI (US); Tokyo Ohka Kogyo Co., Ltd., Kawasaki-Shi, Kanagawa (JP)

( * ) Notice: Subject to any disclaimer, the term of this patent is extended or adjusted under 35 U.S.C. 154(b) by 0 days.

(21) Appl. No.: 12/304,263

(22) PCT Filed: Jun. 27, 2007

(86) PCT No.: PCT/US2007/072222
§ 371 (c)(1),
(2), (4) Date: Jun. 8, 2009

(87) PCT Pub. No.: WO2008/002970
PCT Pub. Date: Jan. 3, 2008

(65) Prior Publication Data
US 2009/0312467 A1    Dec. 17, 2009

Related U.S. Application Data

(60) Provisional application No. 60/806,091, filed on Jun. 28, 2006.

(51) Int. Cl.
*G03F 7/039* (2006.01)
(52) U.S. Cl.
USPC ......... 430/270.1; 430/311; 430/313; 430/314
(58) Field of Classification Search
USPC ............... 528/10; 430/270.1, 311, 313, 314
See application file for complete search history.

(56) References Cited

U.S. PATENT DOCUMENTS

| | | | |
|---|---|---|---|
| 3,615,272 A | 10/1971 | Collins et al. | |
| 4,999,397 A | 3/1991 | Weiss et al. | |
| 5,010,159 A | 4/1991 | Bank et al. | |
| 5,045,592 A | 9/1991 | Weiss et al. | |
| 5,063,267 A | 11/1991 | Hanneman et al. | |
| 5,085,893 A | 2/1992 | Weiss et al. | |
| 5,290,899 A | 3/1994 | Tanaka et al. | |
| 5,385,804 A | 1/1995 | Premlatha et al. | |
| 5,399,462 A | 3/1995 | Sachdev et al. | |
| 5,416,190 A | 5/1995 | Mine et al. | |
| 5,612,170 A | 3/1997 | Takemura et al. | |
| 6,087,064 A | 7/2000 | Lin et al. | |
| 6,210,856 B1 | 4/2001 | Lin et al. | |
| 6,296,985 B1 | 10/2001 | Mizutani et al. | |
| 6,303,268 B1 | 10/2001 | Namba et al. | |
| 6,319,650 B1 | 11/2001 | Gelorme et al. | |
| 6,340,734 B1 | 1/2002 | Lin et al. | |
| 6,353,074 B1 | 3/2002 | Carpenter, II et al. | |
| 6,372,406 B1 | 4/2002 | Brunsvold et al. | |
| 6,399,210 B1 | 6/2002 | Zhong | |
| 6,939,664 B2 * | 9/2005 | Huang et al. | 430/270.1 |
| 7,326,519 B2 * | 2/2008 | Han et al. | 430/270.1 |
| 7,625,687 B2 * | 12/2009 | Hu et al. | 430/270.1 |
| 2002/0081520 A1 | 6/2002 | Sooriyakumaran et al. | |
| 2002/0090572 A1 | 7/2002 | Sooriyakumaran et al. | |
| 2002/0143132 A1 | 10/2002 | Kobayashi et al. | |
| 2003/0054292 A1 | 3/2003 | Choi et al. | |
| 2003/0108812 A1 | 6/2003 | Rottstegge et al. | |
| 2003/0152784 A1 | 8/2003 | Deis et al. | |
| 2003/0191267 A1 | 10/2003 | Boisvert et al. | |
| 2003/0219682 A1 | 11/2003 | Wakiya et al. | |
| 2004/0033440 A1 | 2/2004 | Maeda et al. | |
| 2004/0137241 A1 | 7/2004 | Lin et al. | |
| 2004/0143082 A1 | 7/2004 | Iwasawa et al. | |
| 2004/0229159 A1 | 11/2004 | Kanagasabapathy et al. | |
| 2004/0241579 A1 | 12/2004 | Hamada et al. | |
| 2004/0242821 A1 | 12/2004 | Hatakeyama et al. | |
| 2004/0253535 A1 | 12/2004 | Cameron et al. | |
| 2005/0106494 A1 | 5/2005 | Huang et al. | |
| 2005/0170276 A1 | 8/2005 | Nitta et al. | |
| 2005/0215713 A1 | 9/2005 | Hessell et al. | |
| 2006/0003252 A1 | 1/2006 | Hirayama et al. | |
| 2010/0060558 A1 | 3/2010 | Kim et al. | |

FOREIGN PATENT DOCUMENTS

| | | |
|---|---|---|
| EP | 1142928 | 10/2001 |
| JP | 59-178749 | 10/1984 |
| JP | 63-107122 | 5/1988 |
| JP | 60-86017 | 3/1994 |
| JP | 10251519 A | 9/1998 |
| JP | 2002311591 A | 11/2003 |
| JP | 2004300230 A | 10/2004 |
| WO | WO-02091083 A1 | 11/2002 |

(Continued)

OTHER PUBLICATIONS

Bowden et al., Role of Bilayer Resist in 157 nm Lithograpy, Journal of Photopolymer Science and Technology, vol. 16, No. 4, 2003, 629-636.
Crawford et al., New Materials for 157 nm Photoresist: Characterization and Properties, Advances in Resist Technology and Processing XVII, Francis M. Houlihan, Editor, Proceedings of SPIE vol. 3999, 2000, 357-364.
Fedynyshyn et al., High Resolution Fluorocarbon Based Resist for 157-nm Lithography, Advances in Resist Technology and Processing XIX, Theodore H. Fedynyshyn, Editor, Proceedings of SPIE vol. 4690, 2002, 29-40.
Fujigaya et al., A New Photoresist Material for 157 nm Lithography-2, Journal of Photopolymer Science and Technology, vol. 15, No. 4, 2002, 643-654.
Hung et al., Development of SSQ Based 157 nm Photoresist, Journal of Photopolymer Science and Technology, vol. 16, No. 4, 2003, 591-594.
Hung et al., Development of SSQ Based 157 nm Photoresist[1], Journal of Photopolymer Science and Technology, vol. 15, No. 4, 2002, 693-698.

(Continued)

*Primary Examiner* — Margaret Moore
(74) *Attorney, Agent, or Firm* — Blank Rome LLP

(57) ABSTRACT

A silsesquioxane-based composition that contains (a) silsesquioxane resins that contain $HSiO_{3/2}$ units and $RSiO_{3/2}$ units wherein; R is an acid dissociable group, and (b) 7-diethylamino-4-methylcoumarin. The silsesquioxane-based compositions are useful as positive resist compositions in forming patterned features on substrate, particularly useful for multilayer layer (i.e. bilayer) 193 nm & 157 nm photolithographic applications.

24 Claims, No Drawings

(56) References Cited

FOREIGN PATENT DOCUMENTS

| WO | WO-03063225 A2 | 7/2003 |
| WO | WO-2005/007747 | 1/2005 |
| WO | WO-2005/040918 | 5/2005 |

OTHER PUBLICATIONS

Ito et al., Anphatic platforms for the design of 157 nm chemically amplified resists, Advances in Resist Technology and Processing XIX, Theodore H. Fedynyshyn, Editor, Proceedings of SPIE vol. 4690, 2002, 18-28.

Kunz et al., Outlook for 157-nm resist design, SPIE Conference on Advances in Resist Technology and Processin XVI, SPIE vol. 3678, Mar. 1999, 13-23.

Sooriyakumaran et al., Silicon-containing Resists for 157 nm Applications, Advances in Resist Technology and Processing XVIII, Francis M. Houlihan, Editor, Proceedings of SPIE vol. 4345, 2001, 319-326.

Trinque et al., Advances in Resists for 157 nm Microlithography, Advances in Resist Technology and Processing XIX, Theoddore H. Fedynyshyn, Editor, Proceedings of SPIE vol. 4690, 2002, 58-67.

\* cited by examiner

SILSESQUIOXANE RESIN SYSTEMS WITH BASE ADDITIVES BEARING ELECTRON-ATTRACTING FUNCTIONALITIES

CROSS REFERENCE TO PRIOR APPLICATIONS

This application is the U.S. national phase of International Application No. PCT/US07/72222, filed Jun. 27, 2007, which claims the benefit of U.S. Provisional Application No. 60/806,091, filed Jun. 28, 2006, which is incorporated herein by reference. The International Application was published in English on Jan. 3, 2008 as WO 2008/002970 under PCT Article 21(2)

BACKGROUND OF THE INVENTION

The electronics industry is constantly driven to provide devices that are more powerful yet smaller, faster and less expensive than the previous generation. Over the years, the continual decrease of critical feature sizes necessitates the use of shorter and shorter exposure wavelengths, from visible (G-line, 436 nm) down to ultraviolet (UV) (I-line, 365 nm) to deep ultraviolet (DUV, 248 nm, KrF) to ultra-deep ultraviolet (193 nm, ArF) to 157 nm (F2), even extreme-UV (EUV, 13 nm) in semiconductor industry. 193 nm immersion lithography is rapidly emerging as a viable technology for 65 nm technology nodes and beyond. A good chemically amplified photoresist must meet all of the stringent requirements for microlithography at a given wavelength, such as transparent, chemically amplifiable, soluble in industry standard developer (e.g. tetramethyl ammonium hydroxide—TMAH), resistance to plasma etching, good adhesion to substrates, and exceptional thermal and mechanical properties for processing.

In order to sustain the plasma (RIE) etching process, a certain thickness of resist must be maintained (~400 nm). Therefore, as feature size continues to decrease, the aspect ratios keep increasing (>5). One consequence is that the pattern collapses during the pattern transfer process. This has been one of the key issues when single layer resist is used for smaller features (i.e. 85 nm and beyond).

To cope with the pattern collapsing issue, multi-layer (ML) processes, such as tri-layer processes, are considered in which a thin single-layer (SL) resist is coated on top of a thin hardmask. The major challenge for the tri-layer process is to develop a hardmask layer which has not only high etch resistance, but also other matched optical properties both for the top-layer and the under-layer. There are also some other compatibility issues to be resolved. Furthermore, more steps and higher cost processes are expected.

Another type of multilayer process is the bi-layer (BL) process, in which a thin top image layer (~150 nm), usually a silicon-containing resist, is applied to eliminate or minimize pattern collapse. The top image layer is cast on top of an underlayer, which is usually a high energy absorbing organic layer, such as anti-reflective coating (ARC). Overall, the bilayer process becomes more attractive, because it avoids many difficulties encountered in single and multi-layer approaches, and it is simple and a more cost effective process.

The silicon-containing BL resist provides good etch selectivity for anisotropic etch processes, such as reactive ion etching (RIE) using an oxygen containing plasma. In general, the higher the silicon content (wt %) in a silicon-containing resist the higher the etch resistance.

There are, however, many challenges for the development of silicon-containing resins useful in bilayer resist compositions for 193 nm or 157 nm photolithographic applications. First, incorporation of high silicon content (i.e., >15 wt %, needed for high etch resistance) into the polymer is difficult. Second, most silsesquioxane-based resins have low thermal stability (i.e., low Tg), and it is challenging to obtain high resolution, high sensitivity and a high process latitude for bilayer resist compositions. Third, outgassing of silicon-containing components during 193 nm exposure is one of the major concerns for silicon-containing polymers. Additionally, many resist formulation components, such as base quenchers and photo-acid generators (PAG), may interfere with the silsesquioxane resin structure, and therefore affect shelf-life.

As critical dimension (CD) continues to shrink, pattern collapse associated with conventional single-layer resists has become a serious issue due to their low etch resistance. There is a need to develop improved silicon-containing resins useful in bilayer resist compositions for 193 nm or 157 nm photolithographic applications, which have high etch resistance (high silicon content) with all the silicon incorporated into the polymer backbone to minimize silicon outgassing, as well as high thermal stability to improve process latitude. There is also a need for silicon-containing resist compositions that provide higher sensitivity and resolution for a larger process window. Additionally, there is a need for a silicon-containing resist composition that provides improved stability, and therefore extended resist shelf life.

Due to its unique structure and high content of Si—H bonds, hydrogen silsesquioxane (HSQ) is remarkably transparent at 193 nm and 157 nm. HSQ (commercialized by Dow Corning under the trade name FOx®) has been widely used as a spin-on low-k dielectric material, and already possesses certain characteristics required for a good photoresist, such as thin film quality and thermal and mechanical properties. It is also believed that in a base aqueous solution (like in the commonly used developer, tetra-methyl ammonium hydroxide (TMAH)), the Si—H bond is rapidly converted to a Si—OH moiety, which is base soluble. However it is very difficult, if not impossible, to directly incorporate any acid-labile functional groups onto the HSQ backbone to make HSQ useful as a photoresist.

WO 2005/007747, which is hereby incorporated by reference, describes HSQ-based resins of the general formula $(HSiO_{3/2})_a(RSiO_{3/2})_b$ wherein R is an acid dissociable group, a has a value of 0.2 to 0.9, b has a value of 0.1 to 0.8 and $0.9 \leq a+b \leq 1.0$. These HSQ-based resins are suitable as photoresists. However, these resins have shown instability over time; therefore limiting their application.

BRIEF SUMMARY OF THE INVENTION

This invention pertains to silsesquioxane-based compositions that contain (a) silsesquioxane resins that contain $HSiO_{3/2}$ units and $RSiO_{3/2}$ units wherein R is an acid dissociable group, and (b) 7-diethylamino-4-methylcoumarin.

The 7-diethylamino-4-methylcoumarin stabilizes the silsesquioxane resin resulting in extended shelf life. The compositions may be used in photoresist formulations. The silsesquioxane resins can be, for example, those described in WO 2005/007747.

DETAILED DESCRIPTION OF THE INVENTION

The silsesquioxane resins of this invention contain units of $HSiO_{3/2}$ and $RSiO_{3/2}$ wherein R is an acid dissociable group. One such resin may have the formula $(HSiO_{3/2})_a(RSiO_{3/2})_b$ where a has a value of 0.2 to 0.9, b has a value of 0.1 to 0.8 and $0.9 \leq a+b \leq 1.0$. Alternatively a has a value of 0.4 to 0.8 and b has a value of 0.2 to 0.6. It is believed because of the high content of SiH in the resin that the resists are more transparent (low OD) at 193 nm and 157 nm with higher sensitivity to the light, and because of the high Si content (up to 40 wt %) in the resin with Si—O bond in the main chain. Therefore, the resists comprising the silsesquioxane resins of this invention have superior etch resistance, and low (or no) outgassing.

The silsesquioxane resin having the general formula $(HSiO_{3/2})_a(RSiO_{3/2})_b(HSi(OR^1)O_{2/2})_c$ wherein R, a and b are as described above and $R^1$ is selected from H or a linear or branched $C_1$ to $C_6$ alkyl group and c has a value of 0.01 to 0.4, alternatively 0.05 to 0.15, and $0.9 \leq a+b+c \leq 1.0$. It is believed that the presence of $HSi(OR^1)O_{2/2}$ units improves the adhesion of the resin to the substrate when the resin is used as a resist.

This invention also pertains to silsesquioxane resins having the general formula $(HSiO_{3/2})_a(RSiO_{3/2})_b(Si(OR^1)_xO_{(4-x)/2})_d$ where R, $R^1$, a and b are described above, d has a value of 0.05 to 0.45, alternatively 0.1 to 0.25, $0.9 \leq a+b+d \leq 1.0$, and x has a value of 0 to 3. It is believed that the presence of $Si(OR^1)_xO_{(4-x)/2}$ units enhances the thermo-stability of the resin and affords higher Tg, and therefore improves the resist's resolution, contrast, line-edge roughness (LER), etc.

This invention also pertains to silsesquioxane resins having the general structure $(HSiO_{3/2})_a(RSiO_{3/2})_b(R^2SiO_{3/2})_e$ where R, a, and b are as described previously, $R^2$ is a property modifying functional group, e has a value of 0.01 to 0.25, alternatively 0.05 to 0.15 and, $0.9 \leq a+b+e \leq 1.0$. The $R^2$ group is used to modify properties such as the adhesion or Tg.

This invention also pertains to silsesquioxane resins having the general structure $(HSiO_{3/2})_a(RSiO_{3/2})_b(HSi(OR^1)O_{2/2})_c(R^2SiO_{3/2})_e$ wherein R, $R^1$, $R^2$ a, b, c and e are as described above and $0.9 \leq a+b+c+e \leq 1.0$.

This invention also pertains to silsesquioxane resins having the general structure $(HSiO_{3/2})_a(RSiO_{3/2})_b(Si(OR^1)_xO_{(4-x)/2})_d(R^2SiO_{3/2})_e$ wherein R, $R^1$, $R^2$ a, b, d, e and x are as described above and $0.9 \leq a+b+d+e \leq 1.0$.

This invention also pertains to silsesquioxane resins having the general structure $(HSiO_{3/2})_a(RSiO_{3/2})_b(HSi(OR^1)O_{2/2})_c(Si(OR^1)_xO_{(4-x)/2})_d$ where R, $R^1$, a, b, c, d, and x are described above and $0.9 \leq a+b+c+d \leq 1.0$ This invention also pertains to silsesquioxane resins having the general structure $(HSiO_{3/2})_a(RSiO_{3/2})_b(HSi(OR^1)O_{2/2})_c(Si(OR^1)_xO_{(4-x)/2})_d(R^2SiO_{3/2})_e$ where R, $R^1$, $R^2$ a, b, c, d, e and x are described above and $0.9 \leq a+b+c+d+e \leq 1.0$ The silsesquioxane resins of this invention are not only highly transparent at low wavelength, but also satisfy numerous other requirements for a positive resist, such as adhesion, thermo-stability, chemically-amplifiable, aqueous-base solubility upon photo de-protection, and so on.

The silsesquioxane resins of this invention contain $HSiO_{3/2}$ units and $RSiO_{3/2}$ units where R is an acid dissociable group. An "acid dissociable group" means a molecular moiety that is cleavable with acid, particularly photogenerated acid (PGA). Acid dissociable groups are known in the art and are described, for example, in European Patent Application No. 1142928 and U.S. Patent Application Publication No. 2002/0090572, which are herein incorporated by reference for their teachings of acid dissociable groups. In particular, the acid dissociable groups can be described by the formula

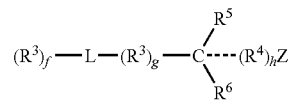

wherein each $R^3$ is independently a linking group,
$R^a$ second linking group;
L is selected from the group consisting of linear or branched alkylene groups having 1 to 10 carbon atoms, fluoroalkylene groups having 2 to 20 carbon atoms, substituted and unsubstituted arylene groups, substituted and unsubstituted cycloalkylene groups, and substituted and unsubstituted alkarylene groups;
$R^5$ is hydrogen, linear or branched alkyl or fluoroalkyl;
$R^6$ is alkyl or fluoroalkyl;
Z is an acid-cleavable group;
f may have a value of 0 or 1;
g may have the value of 0 or 1; and
h may have the value of 0 or 1.

Each $R^3$ may be exemplified by, but not limited to, an alkylene group such as methylene and ethylene.

$R^4$ may be exemplified by, but not limited to, linear or branched alkylene groups, cycloalkylene groups such as norbornyl or cyclohexylene, fluoroalkylene groups, and aryl groups.

L may be exemplified by, but not limited to, substituted (e.g. fluorinated) and unsubstituted methylene, ethylene, norbornene, cycloalkylene and alkarylene moieties.

$R^5$ may be exemplified by, but not limited to, hydrogen, $C_1$ to $C_6$ alkyl groups such as methyl and ethyl and $C_1$ to $C_6$ fluoroalkyl groups such as trifluoromethyl, 2,2,2-trifluoroethyl and 3,3,3-trifluoromethyl.

$R^6$ may be exemplified by, but not limited to, $C_1$ to $C_6$ alkyl groups such as methyl and ethyl and $C_1$ to $C_6$ fluoroalkyl groups such as trifluoromethyl, 2,2,2-trifluoroethyl and 3,3,3-trifluoropropyl.

Z may be exemplified by, but not limited to, —OH, —COOH, esters of the formula —COOR$^7$, carbonates of the formula —OCOOR$^8$, ethers of the formula —OR$^9$, wherein $R^7$, $R^8$ and $R^9$ are selected to render the functionality acid-cleavable.

In the acid dissociable group —COOR$^7$, $R^7$ may be a tertiary alkyl, e.g., t-butyl, a cyclic or alicyclic substituent (generally $C_7$-$C_{12}$) with a tertiary attachment point such as adamantyl, norbornyl, isobornyl, 2-methyl-2-adamantyl, 2-methyl-2-isobornyl, 2-butyl-2-adamantyl, 2-propyl-2-isobornyl, 2-methyl-2-tetracyclododecenyl, 2-methyl-2-dihydrodicyclopentadienyl-cycl-ohexyl, 1-methylcyclopentyl or 1-methylcyclohexyl, or a 2-trialkylsilylethyl group, such as 2-trimethylsilyethyl, or 2-triethylsilylethyl.

Carbonate acid dissociable groups having the formula —OCOOR$^8$ may be exemplified by —O-t-butoxycarbonyl (i.e. $R^8$ is t-butyl). Ether acid dissociable groups having the formula —OR$^9$ may be exemplified by tetrahydropyranyl ether (i.e. $R^9$ is tetrahydropyranyl) and trialkylsilyl ethers (i.e. $R^9$ is a trialkylsilyl such as trimethylsilyl).

Typical Z groups are organic ester groups that undergo a cleavage reaction in the presence of a photogenerated acid to generate a carboxylic acid group.

Acid dissociable groups, R, may be exemplified by, but not limited to, 1,1-dimethylethyl, isopropyl, 2-methylkadamantyl, cyclohexyl, and 2-hydroxy-3-pinanyl or t-butyl ester of norbornane, and others.

In addition to the $(HSiO_{3/2})$ and $(RSiO_{3/2})$ units, the silsesquioxane resins may additionally contain $HSi(OR^1)O_{2/2}$ units, or $Si(OR^1)_xO_{(4-x)/2}$ units, or $(R^2SiO_{3/2})$ units or any combination of theses units to enhance the performance of the silsesquioxane resin. In these units each $R^1$ is independently selected from H or a $C_1$ to $C_6$ alkyl group. $R^1$ may be exemplified by, but not limited to, methyl, ethyl, propyl, butyl, t-butyl and others. Typically $R^1$ is H or methyl. $R^2$ is selected from the group consisting of moieties having the following structure —$R^{21}R^{22}$ where $R^{22}$ is typically —OH or —COOH, or a base-soluble moiety, and $R^{21}$ is a substituted and/or unsubstituted $C_1$ to $C_{12}$ (linear, branched or cyclic) alkyl moieties. $R^2$ may be exemplified by, but not limited to, bicyclo[2,2,1]hept-5-en-2-1,1,1-trifluoro-2-trifluoromethylpropan-2-ol; 2-trifluoromethyl bicyclo[2,2,1]hept-5-en-2-ol, 3,3,3-trifluoropropan-2-ol; and 2-trifluoromethyl-3,3-difluoro-bicyclo[2,2,1]hept-5-en-2-ol.

Typically the silsesquioxane resin will contain 5 to 60 mole % of the $HSi(OR^1)O_{2/2}$ units and more typically 5 to 45 mol % based on all units in the silsesquioxane resin. Additionally, the silsesquioxane resin may contain 5 to 45 mol % of $Si(OR^1)_xO_{(4-x)/2}$ units and more typically 10 to 25 mol % based on all units in the silsesquioxane resin. Further, the silsesquioxane resin may contain 0 to 25 mol % of $(R^2SiO_{3/2})$ units, alternatively 10 to 15 mol % based on all units in the silsesquioxane resin.

The silsesquioxane resins may be exemplified by but not limited to:

$(HSiO_{3/2})_a(RSiO_{3/2})_b$ where R is isopropyl, 2-methylkadamantyl, cyclohexyl, 2-hydroxy-3-pinanyl or t-butyl ester of norbornane; a has a value of 0.4 to 0.9; and b has a value of 0.1 to 0.6;

$(HSiO_{3/2})_a(RSiO_{3/2})_b(R^1OSiO_{3/2})_c(SiO_{4/2})_d$ where R is isopropyl, 2-methylkadamantyl, cyclohexyl, 2-hydroxy-3-pinanyl or t-butyl bicyclo[2,2,1]heptane-2-carboxylate; $R^1$ is H; a has a value of 0.5 to 0.7; b has a value of 0.2 to 0.45; c has a value of 0.05 to 0.2; and d has a value of 0.01 to 0.1

$(HSiO_{3/2})_a(RSiO_{3/2})_b(HSi(OR^1)O_{2/2})_c(Si(OR^1)_xO_{(4-x)/2})_d(R^2SiO_{3/2})_e$ where R is isopropyl, 2-methylkadamantyl, cyclohexyl, 2-hydroxy-3-pinanyl or t-butyl bicyclo[2,2,1]heptane-2-carboxylate; $R^1$ is H; $R^2$ is bicyclo[2,2,1]hept-5-en-2-1,1,1-trifluoro-2-trifluoromethylpropan-2-ol, 2-trifluoromethyl bicyclo[2,2,1]hept-5-en-2-ol, 3,3,3-trifluoropropan-2-ol, 2-trifluoromethyl-3,3-difluoro-bicyclo[2,2,1]hept-5-en-2-ol; a has a value of 0.4 to 0.6; b has a value of 0.2 to 0.45; c has a value of 0.05 to 0.20; d has a value of 0.01 to 0.15; e has a value of 0.01 to 0.25 and x has a value of 0 to 3.

The silsesquioxane resins of this invention may be prepared by reacting (A) a hydrogen silsesquioxane resin having the formula $(HSiO_{3/2})_m(HSi(OR^1)O_{2/2})_n(Si(OR^1)_xO_{(4-x)/2})_p$ where $R^1$ is independently selected from H or a $C_1$ to $C_6$ alkyl group, x has a value of 0 to 3, m has a value of 0.7 to 1.0, typically 0.8 to 0.9; n has a value of 0 to 0.4, typically 0.05 to 0.3; p has a value of 0 to 0.45; and $0.9 \leq m+n+p \leq 1.0$, typically m+n+p 1.0 with (B) an acid dissociable group precursor to produce (C) the silsesquioxane resin having the general formula $(HSiO_{3/2})_{m1}(RSiO_{3/2})_{m2}(HSi(OR^1)O_{2/2})_n(Si(OR^1)_xO_{(4-x)/2})_p$ where $R^1$, n, p and x are as described previously; R is an acid dissociable group; m2 has a value of 0.1 to 0.6, typically 0.2 to 0.4; and m1+m2≈m.

Methods for preparing hydrogen silsesquioxane resins (A) are known in the art. One method involves the hydrolysis of trihalosilanes, such as trichlorosilane, or trialkoxysilanes, such as triethoxysilane. Methods for preparing hydrogen silsesquioxane resins may be found in, but are not limited to, U.S. Pat. No. 3,615,272 to Collins et al., U.S. Pat. No. 5,010,159 to Bank et al., U.S. Pat. No. 4,999,397 to Frye et al., U.S. Pat. No. 6,353,074 to Carpenter et al., U.S. patent application Ser. No. 10/060,558 filed Jan. 30, 2002 and Japanese Patent Kokai Nos. 59-178749, 60-86017 and 63-107122.

The hydrogen silsesquioxane resin is reacted with (B) an acid dissociable group precursor. One method for reacting the hydrogen silsesquioxane resin and acid dissociable group precursor comprises the catalytic hydrosilylation of the acid dissociable group precursor and hydrogen silsesquioxane resin.

Acid dissociable group precursors may be exemplified by, but not limited to, t-butyl ester of norbornene, t-butyl 2-trifluoromethyl acrylate, bicyclo[2,2,1]hept-5-en-2-t-butylcarboxylate, cis-5-norbornene-2,3-dicarboxylic anhydride, and others. Typically the amount of acid dissociable group precursor is added in an amount to provide 5 to 60 mole % of $RSiO_{3/2}$ units in the silsesquioxane resin based on all units in the silsesquioxane resin, alternatively 15 to 35 mol %.

Hydrosilylation catalysts are well known in the art and may be exemplified by, but not limited to, platinum-, nickel- or rhodium-containing compounds. Examples of platinum-containing compounds include $H_2PtCl_6$, di-μ-carbonyldi-π-cyclopentadienyldinickel, a platinum-carbonyl complex, a platinum-divinyltetramethyldisiloxane complex, a platinum cyclovinylmethylsiloxane complex and platinum acetylacetonate (acac). An example of a rhodium-containing compound is $Rh(acac)_2(CO)_2$, and an example of a nickel-containing compound is $Ni(acac)_2$. Typically the amount of hydrosilylation catalyst used is in the amount of 10 to 10,000 ppm, alternatively 100 to 1,000 ppm, based on the amount of reactants (i.e., hydrogen silsesquioxane resin and acid dissociable group precursor).

The reaction between the hydrogen silsesquioxane resin and acid dissociable group precursor is typically carried out at room temperature and ambient pressure, although heat or pressure may be used to facilitate the reaction.

The reaction between the hydrogen silsesquioxane and the acid dissociable group precursor is typically carried out in the presence of a solvent. The solvent may be exemplified by, but not limited to, alcohols, such as ethyl alcohol or isopropyl alcohol; aromatic hydrocarbons, such as benzene or toluene; alkanes, such as n-heptane, dodecane or nonane; ketones, such as methyl iso-butyl ketone; esters; glycol ethers; siloxanes, such as cyclic dimethylpolysiloxanes and linear dimethylpolysiloxanes (e.g., hexamethyldisiloxane, octamethyltrisiloxane and mixtures thereof), 2-ethoxyethanol, propylene glycol methyl ether acetate (PGMEA), cyclohexanone, and 1,2-diethoxyethane, and others. Methyl iso-butyl ketone is typically used. The solvent may be the same solvent used to produce the hydrogen silsesquioxane resin.

The reaction between the hydrogen silsesquioxane resin and acid dissociable group precursor is typically carried out for a time sufficient to react essentially all of the acid dissociable group precursor with the hydrogen silsesquioxane resin. However, to increase the molecular weight of the silsesquioxane resin and/or to improve the storage stability of the silsesquioxane resin, the reaction may be carried out for an extended period of time with heating from 40° C. up to the reflux temperature of the solvent ("bodying step"). The bodying step may be carried out subsequent to the reaction step or as part of the reaction step. Typically, the bodying step is carried out for a period of time in the range of 30 minutes to 6 hours, more preferably 1 to 3 hours.

Silsesquioxane resins containing $R^2SiO_{3/2}$ units are prepared by reacting the hydrogen silsesquioxane resin (A) or silsesquioxane resin (C) with a functional group precursor. Typically, the hydrogen silsesquioxane resin or silsesquioxane resin is reacted with the functional group precursor by catalytic hydrosilylation of the functional group precursor and hydrogen silsesquioxane resin or silsesquioxane resin. The catalytic hydrosilylation reaction is carried out using the same or similar process conditions as those described above for the catalytic hydrosilylation reaction between the hydrogen silsesquioxane resin and acid dissociable group precursor.

In one process, the hydrogen silsesquioxane resin (A) may reacted with the functional group precursor to produce a resin having the formula $$(HSiO_{3/2})_{m1}(R^2SiO_{3/2})_{m3}(HSi(OR^1)O_{2/2})_n(Si(OR^1)_xO_{(4-x)/2})_p$$

where $R^1$, n, p and x are as described previously; $R^2$ is a property modifying functional group; m3 has a value of 0.01 to 0.25, typically 0.05 to 0.15; and $m1+m3 \approx m$. This resin is then reacted with the acid dissociable group precursor to produce a resin having the formula $$(HSiO_{3/2})_{m1}(RSiO_{3/2})_{m2}(R^2SiO_{3/2})_{m3}(HSi(OR^1)O_{2/2})_n(Si(OR^1)_xO_{(4-x)/2})_p$$

where R, $R^1$, $R^2$, n, p, m1, m2, m3 and x are as described previously and $m1+m2+m3 \approx m$. In an alternative process the silsesquioxane resin (C) may be reacted with the functional group precursor to produce a resin have the formula $$(HSiO_{3/2})_{m1}(RSiO_{3/2})_{m2}(R^2SiO_{3/2})_{m3}(HSi(OR^1)O_{2/2})_n(Si(OR^1)_xO_{(4-x)/2})_p$$

where R, $R^1$, $R^2$, n, p, m1, m2, m3 and x are as described previously and $m1+m2+m3 \approx m$. In an alternative process, the hydrogen silsesquioxane resin (A) may be reacted with a mixture comprising both the functional group precursor and acid dissociable group precursor to produce a resin having the formula $$(HSiO_{3/2})_{m1}(RSiO_{3/2})_{m2}(R^2SiO_{3/2})_{m3}(HSi(OR^1)O_{2/2})_n(Si(OR^1)_xO_{(4-x)/2})_p$$

where R, $R^1$, $R^2$, n, p, m1, m2, m3 and x are as described previously and $m1+m2+m3 \approx m$. In a typical method, the hydrogen silsesquioxane resin is reacted with the acid dissociable group precursor and the silsesquioxane resin is reacted with the functional group precursor.

The novel functionalized hydrogen silsesquioxane-based resins of the present invention have a weight average molecular weight of about 500 to 100,000, preferably about 1,500 to 50,000, and more preferably about 2,000 to 30,000.

The novel functionalized hydrogen silsesquioxane resins of the present invention have adequate thermal stability, or more specifically a proper glass transition temperature (Tg) that is adequate for photoresist processing, such as post apply baking (PAB) and post-exposure baking (PEB). The Tg for the functionalized hydrogen silsesquioxane resins of the present invention is preferably 50 to 250° C., more preferably 70 to 180° C., and most preferably 80 to 150° C.

Another embodiment of this invention is a photoresist composition comprising (A) the silsesquioxane resins and 7-diethylamino-4-methylcoumarin described herein and (B) one or more acid generators. The photoresist may take the form of a negative or a positive photoresist and other components and additives may be present. Typically, the silsesquioxane resin is present in the photoresist composition in an amount up to 99.5 wt. % and the acid generator in an amount of 0.5-10 wt. %, based on the solids contained in the composition.

The acid generator is a compound that generates acid upon exposure to radiation. This acid then causes the acid dissociable group in the silsesquioxane resin to dissociate. Acid generators are well known in the art and are described in, for example, EP 1 142 928 A1. Acid generators may be exemplified by, but not limited to, onium salts, halogen-containing compounds, diazoketone compounds, sulfone compounds, sulfonate compounds and others.

Examples of onium salts include, but are not limited to, iodonium salts, sulfonium salts (including tetrahydrothiophenium salts), phosphonium salts, diazonium salts, and pyridinium salts.

Examples of halogen-containing compounds include, but are not limited to, mahaloalkyl group-containing hydrocarbon compounds, haloalkyl group-containing heterocyclic compounds, and others.

Examples of diazoketone compounds include, but are not limited to, 1,3-diketo-2-diazo compounds, diazobenzoquinone compounds, diazonaphthoquinone compounds, and others.

Examples of sulfone compounds, include, but are not limited to, β-ketosulfone, β-sulfonylsulfone, α-diazo compounds of these compounds, and others.

Examples of sulfonate compounds include, but are not limited to, alkyl sulfonate, alkylimide sulfonate, haloalkyl sulfonate, aryl sulfonate, imino sulfonate, and others.

The preferred acid generators are sulfonated salts, in particular sulfonated salts with perfluorinated methide anions.

Other additives may be used in the photoresist composition. For example, if the photoresist is a positive photoresist then the photoresist composition may include organic base additives (or quenchers as acid-diffusion controllers), surfactants, dissolution inhibitors, cross-linking agents, sensitizers, halation inhibitors, adhesion promoters, storage stabilizers, anti-foaming agents, coating aids, plasticizers and others. Typically, the sum of all additives (not including the acid generator) will comprise less than 20 percent of the solids included in the photoresist composition, alternatively less than 5 percent.

Typically the silsesquioxane-based compositions are delivered in a solvent. The choice of solvent is governed by many factors, such as the solubility and miscibility of the silsesquioxane resin and 7-diethylamino-4-methylcoumarin, and safety and environmental regulations. Typical solvents include ether-, ester-, hydroxyl- and ketone-containing compounds. Examples of solvents include, but are not limited to, cyclopentanone, cyclohexanone, lactate esters such as ethyl lactate, alkylene glycol alkyl ether esters such as propylene glycol methyl ether acetate, alkylene glycol monoalkyl esters such as methyl cellusolve, butyl acetate, 2-ethoxyethanol, and ethyl 3-ethoxypropionate. Typically solvents for silsesquioxane resins include, but are not limited to, cyclopentanone (CP), propylene glycol methyl ether acetate (PGMEA), ethyl lactate (EL), methyl isobutyl ketone (MIBK), methyl ethyl ketone (MEK), ethyl 3-tethoxypropionate, methyl n-amyl ketone (MAK) and any their mixtures.

The amount of solvent is typically present in an amount of 50 to 99.5 wt % based on the total weight of the silsesquioxane based composition, alternatively 80 to 95 wt %.

EXAMPLES

The following examples are included to demonstrate the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages are in wt. %.

Example 1

Hydrogen Silsesquioxane Resin (HSQ) Synthesis 100 grams of toluenesulfonic acid monohydrate (TSAM) solution prepared by sulfonating toluene using concentrated $H_2SO_4$ and fume $SO_3$ was added into a 500-ml flask equipped with a water condenser, thermometer, magnetic stir bar, and nitrogen bubbler. Then a solution of trichlorosilane (10 grams, 0.075 mole) in 50 grams of toluene was added dropwise into the flask with consistent strong stirring. After the addition, the mixture was washed at least 3 times with deionized (DI) water, and the organic phase was collected. Then the solvent was stripped off with a rotary evaporator under reduced pressure to give a hydrogen silsesquioxane resin solution with solid content in the range of 5 to 25%.

Example 2

HSQ and t-Butyl 2-Trifluoromethyl Acrylate Resin

An olefin solution was separately prepared by mixing ~0.1 mole of t-butyl 2-trifluoromethyl acrylate (TBTFMA) with anhydrate toluene (50:50). To this mixture ~200 ppm 1,3-diethenyl-1,1,3,3-tetramethyldisiloxane complex (platinum, concentrated) was added.

The olefin solution was charged into a flask equipped with a water condenser, thermometer, magnetic stir bar, and nitrogen bubbler. After purging with nitrogen, the HSQ solution prepared in Example 1 (containing ~0.33 mole of HSQ solid) was slowly added into the olefin solution. After the addition, the system was refluxed for approximately 4 hours while stirring moderately. The hydrosilylation reaction was monitored using 1H NMR until the olefin peaks disappeared completely.

Final resin solutions with a solid content ranging from 4 to 45 wt % were prepared by solvent exchange to a desired solvent, such as propylene glycol methyl ether acetate (PGMEA), ethyl lactate (EL), methyl isobutyl ketone (MIBK). The molecular weight of the resin ranged from 3,000 to 25,000.

Example 3

HSQ and Bicyclo[2,2,1]hept-5-ene-2-t-Butylcarboxylate Resin

An olefin solution was separately prepared by mixing approximately 0.1 moles of bicyclo[2,2,1]hept-5-ene-2-t-butylcarboxylate with anhydrate toluene (50:50). To this mixture 200 ppm 1,3-diethenyl-1,1,3,3-tetramethyldisiloxane complex (platinum, concentrated) was added.

The olefin solution was charged into a flask equipped with a water condenser, thermometer, magnetic stir bar, and nitrogen bubbler. After purging with nitrogen, the HSQ solution prepared in Example 1 (containing ~0.33 mole of HSQ) was slowly added into the olefin solution. After the addition, the system was refluxed for 8 hours while stirring moderately. The hydrosilylation reaction was monitored using 1H NMR until the olefin peaks disappeared completely.

The final resin solution with a solid content ranging from 4 to 45 wt % was prepared by either solvent exchange to a desired solvent, such as propylene glycol methyl ether acetate (PGMEA), ethyl lactate (EL), methyl isobutyl ketone (MIBK).

Example 4

HSQ and cis-5-Norbornene-2,3-dicarboxylic Anhydride Resin

An olefin solution was separately prepared by mixing ~0.10 mole of cis-5-Norbornene-2,3-dicarboxylic anhydride with anhydrate toluene (50:50). To this mixture ~200 ppm 1,3-diethenyl-1,1,3,3-tetramenthyldisiloxane complex (platinum-concentrated) was added.

The olefin solution was charged into a flask equipped with a water condenser, thermometer, magnetic stir bar, and nitrogen bubbler. After purging with nitrogen, the HSQ solution prepared in Example 1 (containing ~0.33 mole of HSQ,) was slowly added into the olefin solution. After the addition, the system was refluxed for 3 hours while stirring moderately. The hydrosilylation reaction was monitored using 1H NMR until the olefin peaks disappeared completely.

The final resin solution with a solid content ranging from 4 to 45 wt % was prepared by either solvent exchange to a desired solvent, such as propylene glycol methyl ether acetate (PGMEA), ethyl lactate (EL), methyl isobutyl ketone (MIBK).

Example 5

Formulation of the SSQ-Based Resin with 7-diethylamino-4-methylcoumarin

A photoresist composition was prepared by mixing until homogeneous: 15 parts silsesquioxane resin prepared in Example 3, 0.3 parts photoacid generator, either $(C_6H_5)_3S^+ SbF_6^-$ or $(p-(CH_3)_3CC_6H_4)_3C^-(SO_2CF_3)_3$ obtained from 3M), 84.7 parts PGMEA (electronic grade from General Chemical). Additionally about 0.01 parts of the organic base: 7-diethylamino-4-methylcoumarin, was added to the solution above.

The formulated photoresist solution was filtered through a 0.2 micron syringe filter, and then spin-coated onto a 6" silicon wafer. The coated wafer was baked at 130° C. for 60 seconds before exposure at 248 nm or 193 nm with dose ranged from 8 to 100 mJ/cm². The film was then baked at 130° C. for 90 seconds, and developed with 0.263 N tetra-methyl ammonium hydroxide (MF CD26 from Shipley). High-resolution positive images with high contrast and low line-edge roughness (LER) were obtained. Additionally, the chemical stability (i.e., the resist shelf-life) and the CD stability of the formulated photoresist demonstrated significant improvement.

What is claimed is:

1. A composition comprising:
   (I) a silsesquioxane resin comprising $HSiO_{3/2}$ units and $RSiO_{3/2}$ units where R is an acid dissociable group having the formula

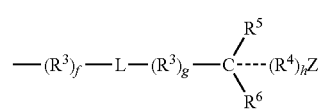

wherein each $R^3$ is independently a linking group;
   $R^4$ is a second linking group;

L is selected from the group consisting of linear or branched alkylene groups having 1 to 10 carbon atoms, fluoroalkylene groups having 2 to 20 carbon atoms, substituted and unsubstituted arylene groups, substituted and unsubstituted cycloalkylene groups, and substituted and unsubstituted alkarylene groups;

$R^5$ is hydrogen, linear or branched alkyl or fluoroalkyl;

$R^6$ is alkyl or fluoroalkyl;

Z is an acid-cleavable group;

f may have a value of 0 or 1;

g may have the value of 0 or 1;

h may have the value of 0 or 1; and (II) 7-diethylamino-4-methylcoumarin, wherein 7-diethylamino-4-methylcoumarin is present in a positive amount less of than 20% (calculated based on the weight of the composition without any acid generator) of the solids included in the composition.

2. The composition as claimed in claim 1 wherein the silsesquioxane resin has the formula $(HSiO_{3/2})_a(RSiO_{3/2})_b$ wherein a has a value of 0.4 to 0.9, b has a value of 0.1 to 0.6, and $0.9 \leq a+b \leq 1.0$.

3. The composition as claimed in claim 2 wherein a has a value of 0.6 to 0.8 and b has a value of 0.2 to 0.4.

4. The composition as claimed in claim 1 wherein the silsesquioxane resin has the formula $(HSiO_{3/2})_a(RSiO_{3/2})_b(HSi(OR^1)O_{2/2})_c$ wherein $R^1$ is selected from H or a linear or branched $C_1$ to $C_6$ alkyl group, a has a value of 0.4 to 0.9, b has a value of 0.1 to 0.6, c has a value of 0.01 to 0.4, and $0.9 \leq a+b+c \leq 1.0$.

5. The composition as claimed in claim 4 wherein a has a value of 0.6 to 0.8, b has a value of 0.2 to 0.4 and c has a value of 0.05 to 0.15.

6. The composition as claimed in claim 1 wherein the silsesquioxane resin has the formula $(HSiO_{3/2})_a(RSiO_{3/2})_b(Si(OR^1)_xO_{(4-x/2)})_d$ wherein $R^1$ is selected from H or a linear or branched $C_1$ to $C_6$ alkyl group, a has a value of 0.4 to 0.9, b has a value of 0.1 to 0.6, d has a value of 0.05 to 0.45, $0.9 \leq a+b+d \leq 1.0$, and x has a value of 0 to 3.

7. The composition as claimed in claim 6 wherein a has a value of 0.6 to 0.8, b has a value of 0.2 to 0.4 and d has a value of 0.1 to 0.25.

8. The composition as claimed in claim 1 wherein the silsesquioxane resin has the formula $(HSiO_{3/2})_a(RSiO_{3/2})_b(HSi(OR^1)O_{2/2})_c(Si(OR^1)_xO_{(4-x/2)})_d$ wherein $R^1$ is selected from H or a linear or branched $C_1$ to $C_6$ alkyl group, a has a value of 0.4 to 0.9, b has a value of 0.1 to 0.6, c has a value of 0.01 to 0.4, d has a value of 0.05 to 0.45, $0.9 \leq a+b+c+d \leq 1.0$ and x has a value of 0 to 3.

9. The composition as claimed in claim 8 wherein a has a value of 0.6 to 0.8, b has a value of 0.2 to 0.4, c has a value of 0.05 to 0.15 and d has a value of 0.1 to 0.25.

10. The composition as claimed in claim 1 wherein the silsesquioxane resin has the formula $(HSiO_{3/2})_a(RSiO_{3/2})_b(R^2SiO_{3/2})_e$ wherein $R^2$ is a property modifying functional group, a has a value of 0.4 to 0.9, b has a value of 0.1 to 0.6, e has a value of 0.01 to 0.25, and $0.9 \leq a+b+e \leq 1.0$.

11. The composition as claimed in claim 10 wherein a has a value of 0.6 to 0.8, b has a value of 0.2 to 0.4, and e has a value of 0.05 to 0.15.

12. The composition as claimed in claim 1 wherein the silsesquioxane resin has the formula $(HSiO_{3/2})_a(RSi_{3/2})_b(HSi(OR^1)O_{2/2})_c(R^2SiO_{3/2})_e$ wherein $R^1$ is selected from H or a linear or branched $C_1$ to $C_6$ alkyl group; $R^2$ is a property modifying functional group; a has a value of 0.4 to 0.9, b has a value of 0.1 to 0.6, c has a value of 0.01 to 0.4, e has a value of 0.01 to 0.25, and $0.9 \leq a+b+c+e \leq 1.0$.

13. The composition as claimed in claim 12 wherein a has a value of 0.6 to 0.8, b has a value of 0.2 to 0.4, c has a value of 0.05 to 0.15 and e has a value of 0.05 to 0.15.

14. The composition as claimed in claim 1 wherein the silsesquioxane resin has the formula $(HSiO_{3/2})_a(RSiO_{3/2})_b(Si(OR^1)_xO_{(4-x/2)})_d(R^2SiO_{3/2})_e$ wherein $R^1$ is selected from H or a linear or branched $C_1$ to $C_6$ alkyl group, $R^2$ is a property modifying functional group, a has a value of 0.4 to 0.9, b has a value of 0.1 to 0.6, d has a value of 0.05 to 0.45, e has a value of 0.01 to 0.25, $0.9 \leq a+b+d+e \leq 1.0$ and x has a value of 0 to 3.

15. The composition as claimed in claim 14 wherein a has a value of 0.6 to 0.8, b has a value of 0.2 to 0.4 and d has a value of 0.1 to 0.25 and e has a value of 0.05 to 0.15.

16. The composition as claimed in claim 1 wherein the silsesquioxane resin has the formula $(HSiO_{3/2})_a(RSiO_{3/2})_b(HSi(OR^1)O_{2/2})_c(Si(OR^1)_xO_{(4-x/2)})_d(R^2SiO_{3/2})_e$ wherein $R^1$ is selected from H or a linear or branched $C_1$ to $C_6$ alkyl group, $R^2$ is a property modifying functional group, a has a value of 0.4 to 0.9, b has a value of 0.1 to 0.6, c has a value of 0.01 to 0.4, d has a value of 0.05 to 0.45, e has a value of 0.01 to 0.25, $0.9 \leq a+b+c+d+e \leq 1.0$ and x has a value of 0 to 3.

17. The composition as claimed in claim 16 wherein a has a value of 0.6 to 0.8, b has a value of 0.2 to 0.4, c has a value of 0.05 to 0.15 and d has a value of 0.1 to 0.25 and e has a value of 0.05 to 0.15.

18. The composition as claimed in claim 1 wherein Z is selected from —OH, —COOH, esters of the formula —COOR$^7$, carbonates of the formula —OCOOR$^8$, ethers of the formula —OR$^9$, wherein $R^7$, $R^8$ and $R^9$ are selected to render Z acid-cleavable.

19. The composition as claimed in claim 18 wherein Z is an ester of the formula —COOR$^7$ wherein $R^7$ is a tertiary alkyl group.

20. The composition as claimed in claim 1 wherein R is selected from 1,1 dimethylethyl bicyclo[2,2,1]heptane-2-carboxylate, isopropyl bicyclo[2,2,1]heptane-2-carboxylate, 2-methyladamantyl bicyclo[2,2,1]heptane-2-carboxylate, cyclohexyl bicyclo[2,2,1]heptane-2-carboxylate, 2-hydroxy-3-pinanyl bicyclo[2,2,1]heptane-2-carboxylate and t-butyl bicyclo[2,2,1]heptane-2-carboxylate.

21. The composition as claimed in claim 20 wherein R is t-butyl bicyclo[2,2,1]heptane-2-carboxylate.

22. The composition as claimed in claim 1 wherein the silsesquioxane resin has the formula $(HSiO_{3/2})_a(RSiO_{3/2})_b$ where R is selected from isopropyl bicyclo[2,2,1]heptane-2-carboxylate, 2-methyladamantyl bicyclo[2,2,1]heptane-2-carboxylate 1, cyclohexyl bicyclo[2,2,1]heptane-2-carboxylate, 2-hydroxy-3-pinanyl bicyclo[2,2,1]heptane-2-carboxylate and t-butyl bicyclo[2,2,1]heptane-2-carboxylate and a has a value of 0.4 to 0.9, b has a value of 0.1 to 0.6 and $0.9 \leq a+b \leq 1.0$.

23. The silsesquioxane resin as claimed in claim 1 wherein the silsesquioxane resin has the formula $(HSiO_{3/2})_a(RSiO_{3/2})_b(R^1OSiO_{3/2})_c(SiO_{4/2})_d$ where R is selected from isopropyl bicyclo[2,2,1]heptane-2-carboxylate, 2-methyladamantyl bicyclo[2,2,1]heptane-2-carboxylate, cyclohexyl bicyclo[2,2,1]heptane-2-carboxylate, 2-hydroxy-3-pinanyl bicyclo[2,2,1]heptane-2-carboxylate and t-butyl bicyclo[2,2,1]heptane-2-carboxylate; $R^1$ is H; a has a value of 0.5 to 0.7, b has a value of 0.2 to 0.45, c has a value of 0.05 to 0.2, d has a value of 0.01 to 0, and $0.9 \leq a+b+c+d \leq 1.0$.

24. The composition as claimed in claim 1 wherein the silsesquioxane resin has the formula $(HSiO_{3/2})_a(RSiO_{3/2})_b(HSi(OR^1)O_{2/2})_c(Si(OR^1)_xO_{(4-x/2)})_d(R^2SiO_{3/2})_e$ where R is selected from isopropyl bicyclo[2,2,1]heptane-2-carboxylate, 2-methyladamantyl bicyclo[2,2,1]heptane-2-carboxylate, cyclohexyl bicyclo[2,2,1]heptane-2-carboxylate, 2-hydroxy-3-pinanyl bicyclo[2,2,1]heptane-2-carboxylate and t-butyl bicyclo[2,2,1]heptane-2-carboxylate; $R^1$ is H; $R^2$ is selected from bicyclo[2,2,1]hept-5-ene-2-1,1,1-trifluoro-2-trifluoromethylpropane-2-ol, 2-trifluoromethyl bicyclo[2,2,1]hept-5-en-2-ol, 3,3,3-trifluoropropane-2-ol, 2-trifluoromethyl-3,3-difluoro-bicyclo[2,2,1]hept-5-en-2-ol; a has a value of 0.4 to 0.6, b has a value of 0.2 to 0.45, c has a value of 0.05 to 0.20, d has a value of 0.01 to 0.15, e has a value of 0.01 to 0.25, $0.9 \leqq a+b+c+d+e \leqq 1.0$ and x has a value of 0 to 3.

* * * * *